United States Patent [19]
Box

[11] 3,966,084
[45] June 29, 1976

[54] LATCH FOR A POULTRY TRANSPORT CAGE

[76] Inventor: Theodor Box, 1108 Aileen Road, Brielle, N.J. 08730

[22] Filed: Aug. 21, 1975

[21] Appl. No.: 606,460

[52] U.S. Cl. ............................. 220/326; 220/334
[51] Int. Cl.² ................... B65D 45/16; B65D 43/16
[58] Field of Search ........... 220/306, 315, 324, 326, 220/334; 119/19; 43/54.5

[56] References Cited
UNITED STATES PATENTS

| | | | |
|---|---|---|---|
| 2,936,189 | 5/1960 | Pearson | 220/326 X |
| 3,217,919 | 11/1965 | Long et al. | 220/324 X |
| 3,754,676 | 8/1973 | Box | 220/324 |

*Primary Examiner*—William Price
*Assistant Examiner*—Steven M. Pollard

[57] ABSTRACT

A poultry transport cage of the type having a rectangular frame structure supporting openwork sides, ends, bottom and top and having a complementary hinged lid is provided with an improved latch which comprises a sliding latch having a horizontal portion with a vertical portion depending therefrom in the front containing a catch which engages a beam member in the top of the cage. Guide means depend from the sides of the horizontal portion and fit into slots in the lid for sliding motion therein. The lid contains a spring member biasing the sliding catch to hold it in engagement with the beam in the top of the cage. In the illustrated embodiment all parts are made of molded plastic and the spring means is molded integrally with the lid.

11 Claims, 6 Drawing Figures

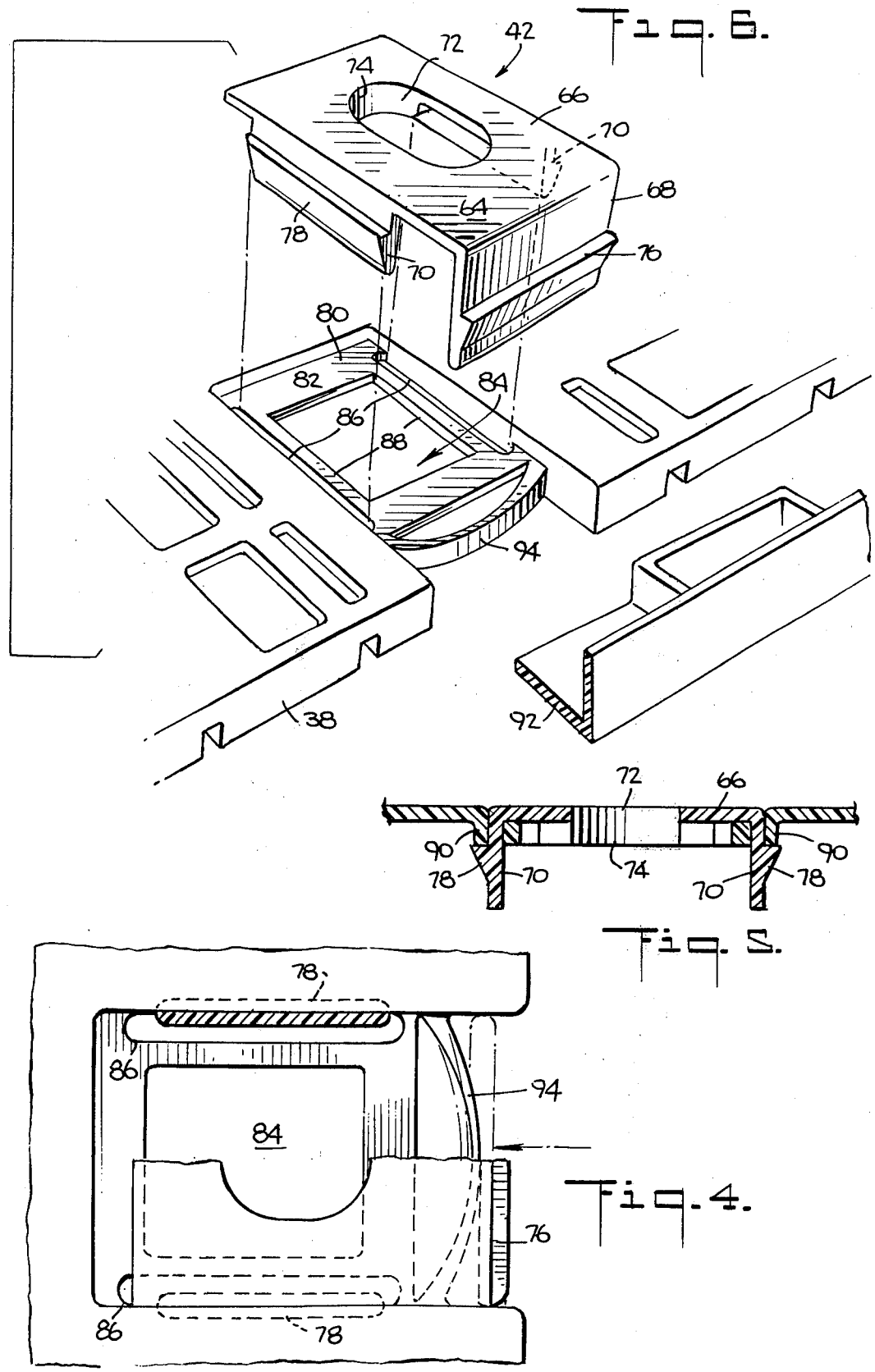

LATCH FOR A POULTRY TRANSPORT CAGE

BACKGROUND OF THE INVENTION

This invention relates to animal cages such as poultry transport cages of the stacking type used for making truckload shipments of live pountry in general, and more particularly to an improved latch for such cages.

As described in my previous U.S. Pat. No. 3,754,676 issued Aug. 28, 1973, poultry is usually shipped in rectangular cages each holding six chickens for purposes of convenience in handling and to minimize injury. In that patent, I described and claimed an improved molded plastic rectangular cage which had an enlarged rounded access opening for easier loading and unloading with reduced likelihood to injury to poultry. The cage described therein meets the size, weight and strength requirements for cages in the contemplated service. In other words, it is capable of supporting a standing man, as is necessary when loading and stacking a plurality of these cages. The described cage includes a gridwork structure including lateral and longitudinal beams necessary for strength. Furthermore, it includes enlarged longitudinal beam members in combination with lateral cross beam members to define the lateral and longitudinal boundaries of an access opening in the top. Each longitudinal beam member is offset outwardly for at least a portion of the access opening to provide a widened and approximately rounded opening.

A complementary lid hinged to one of the beam members fits within the access opening so that its top surface is substantially flush with the top of the cage structure. Lid supporting flanges extend at an angle across each corner of the opening to further round the access opening without substantially reducing its useable area. Also described was a preferred embodiment made up of two identical cage halves of molded plastic joined together by metal or plastic fasteners to form a complete cage. As described, the lid member was pivotally mounted to a transverse beam member using plastic hinges so that it fitted within the access opening formed at the top of the cage. The lid was held in the closed position by means of an integrally molded latch member. The latch member comprised a rectangular portion joined on three sides to corresponding edges of a rectangular cutout portion on the lid. At each end the rectangular portion was joined to the lid by plastic torsional hinge tabs and at one side was joined to the lid by an S-shaped plastic spring to permit limited rotation about the axis of the torsional hinge tabs. A bevelled lip was contained on the other side to catch under the bottom of the lateral beam member of the top for locking engagement therewith. Opening was accomplished by pulling up on the side of the rectangular portion attached by means of the S-shaped plastic spring member.

Although this arrangement offers the advantages of integral molding of the latch and the lid it has been found to suffer from disadvantages. The latch is not particularly easy to operate and the torsional members and spring are subject to breaking as they become fatigued. When such occurs this requires the replacement of the complete lid. In view of these difficulties, the need for an improved latch for the lid of a poultry cage of this nature becomes evident.

SUMMARY OF THE INVENTION

The present invention provides such an improved latch for the lid of a poultry cage of the type described above. The latch of the present invention includes a sliding latch member having a horizontal portion and a vertical portion depending from the front thereof. The latch is a separate molded member. Vertically depending from the horizontal portion along its two sides are guide means which slide in slots formed in the top of the lid. In order that the guide means are retained within the slots, they are provided with tapered flanges to permit snapping the sliding latch into place. The lid is also provided with spring means for biasing the latch outwardly to cause a beveled lip on the vertical depending portion to engage the bottom of the lateral beam member opposite the edge of the lid. In the illustrated embodiment, the spring member comprises a bowed member molded into the lid. The horizontal portion of the sliding latch includes an opening so that it can be grasped to move it back against the spring force to disengage the flange from the beam to open the lid.

BRIEF DESCRIPTION OF THE DRAWINGS

FIG. 4 is a plan view partially cut away of the latch of the present invention.

FIG. 5 is a cross section taken along the line 5—5 of FIG. 3 illustrating the manner in which the sliding latch is retained within the slots of the lid.

FIG. 6 is a perspective, exploded view of the sliding latch, showing its relationship to the lid and to the transverse beam which it engages.

DETAILED DESCRIPTION OF THE PREFERRED EMBODIMENT

Figure 1:
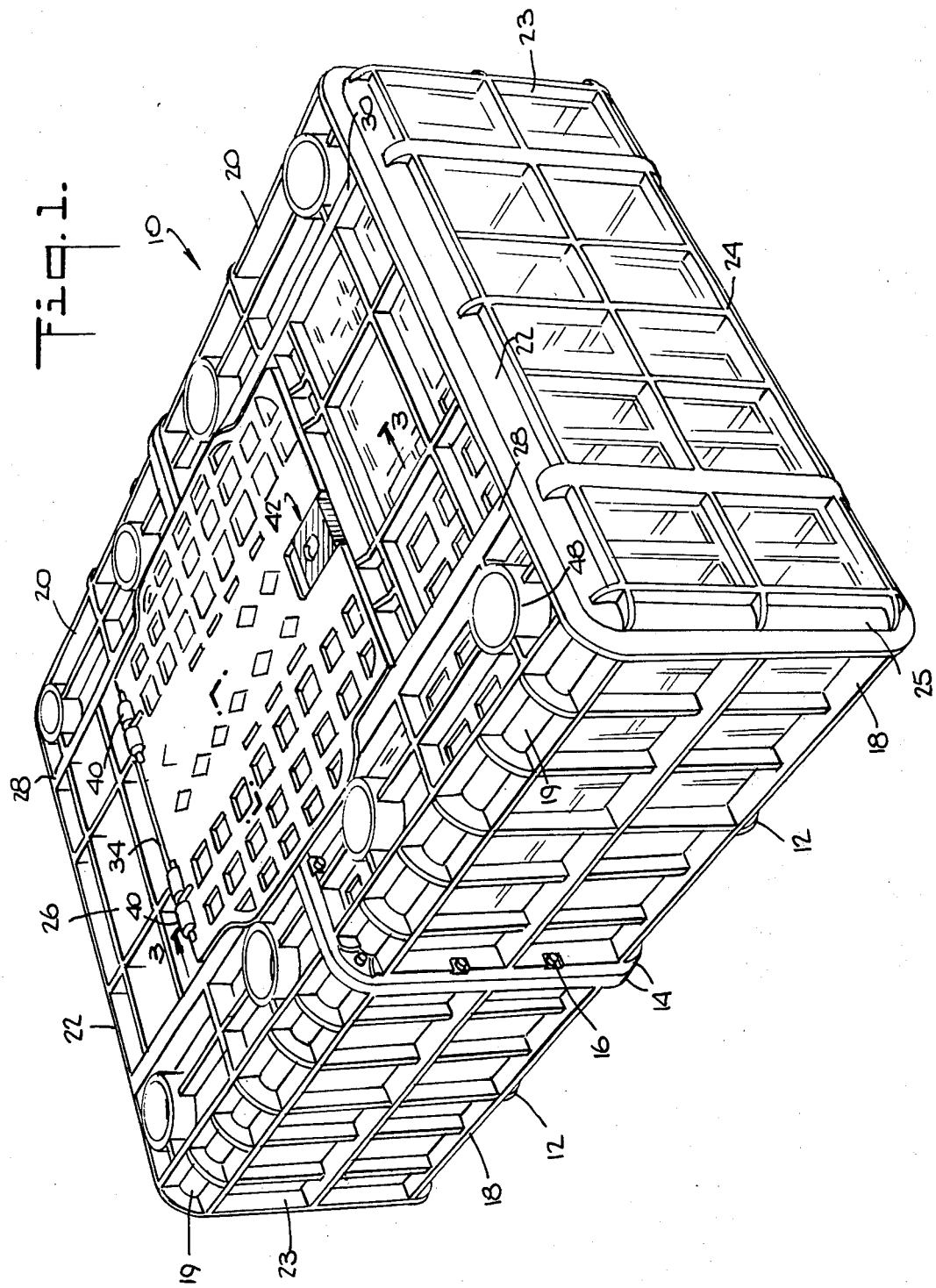
FIG. 1 is a top perspective view of a poultry cage including the latch of the present invention.
Figure 2:
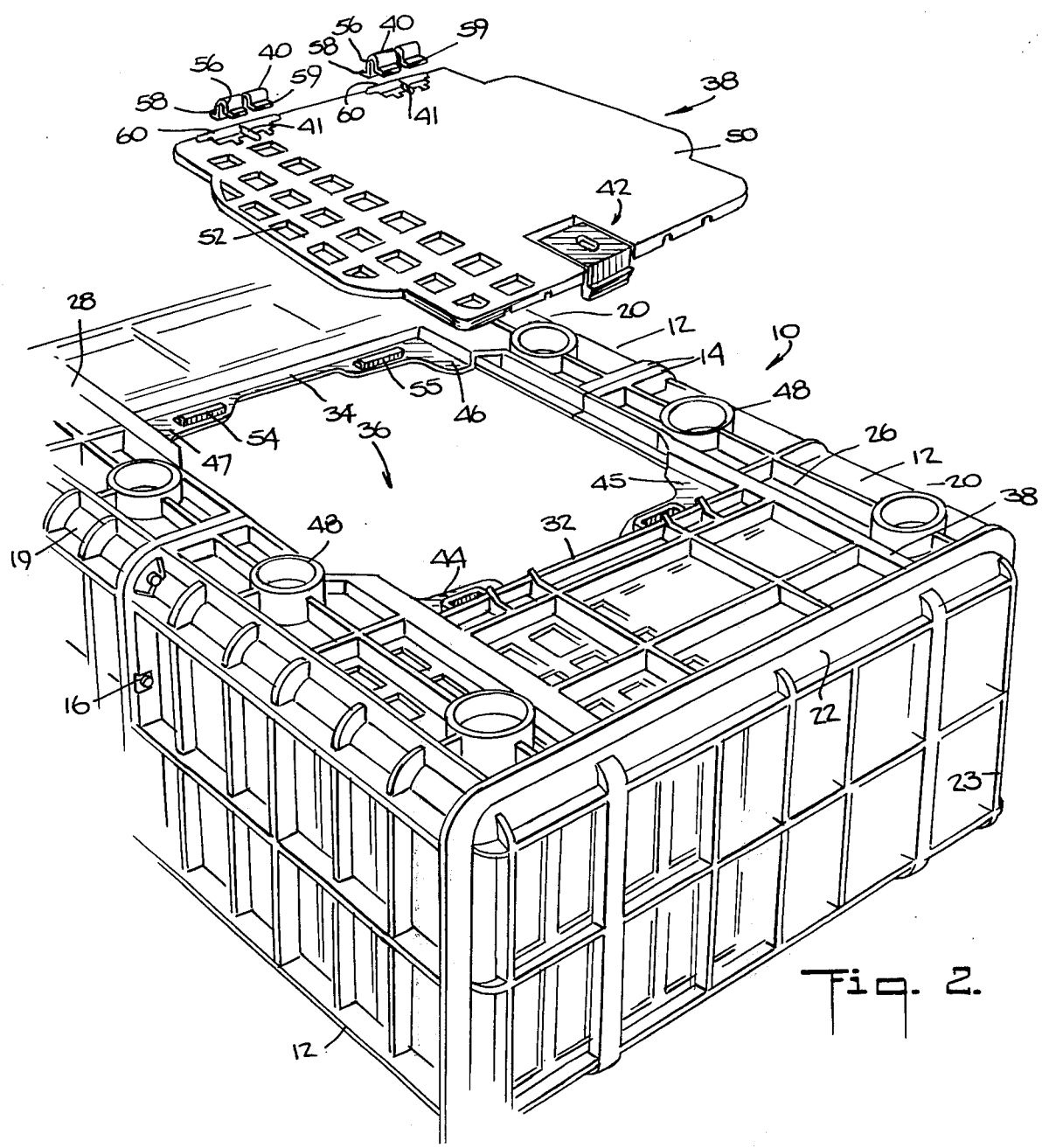
FIG. 2 is a similar view exploded to show the lid with its hinges and latch separated from the cage.

FIGS. 1 and 2 illustrate a poultry cage 10 of the general type described in my aforementioned patent but having the improved latch of the present invention. The cage is assembled of two identical molded halves 12 joined together at their flanged bases 14 by steel bolts 16 or plastic rivets (not shown). Each molded half includes a rectangular frame comprising enlarged longitudinal side frame beam members 18, 19, 20 and 21 and enlarged end frame beam members 22, 23, 24 and 25. The sides, ends, bottom and top of the cage are of overall openwork construction with alternate heavy and light sections to provide maximum strength with minimum weight. The top 26 of cage 10 includes an additional pair of enlarged longitudinal beam members 28 and 30 joined by lateral beam members 32 and 34 to define an access opening 36. A lid member 38 pivotally mounted to transverse beam member 34 by plastic hinges 40 fits within access opening 36. Lid member 38 is held in shut position by the latch arrangement 42 of the present invention.

Lid-supporting flanges 44, 45, 46 and 47 extend across each corner of access opening 36 at a depth such that the lid is supported when shut with its top surface flush with the top surface of the cage. Between each longitudinal beam member 28 and 30 and its respective adjacent side frame member 19 and 20 is a row of moled cylindrical members 48 adapted to fit within complementary socket members (not shown) extending below the surface of the bottom of another cage for locking engagement when the cages are stacked one on another.

To increase the effective area of access opening 36, longitudinal beam members 28 and 30 are offset outwardly for a portion of the opening by means of a change from an inverted U-shaped cross section near the ends of the cage to an L-shaped cross section adjacent the opening. The vertical leg of the L-shaped cross section is slightly displaced laterally outward from the line of the outermost vertical leg of the U-shaped cross section. Lid member 38 is formed with lateral wing portions 50 and 52 to correspond with the wider access opening created by this change in longitudinal beam member cross section.

As indicated clearly in FIG. 2, the end result is a substantially rounded access opening having maximum lateral and longitudinal dimensions. The area of the opening is at least one-third of the total area of the top of the cage. This enlarged opening is obtained without sacrificing the bending strength of longitudinal beam members 28 and 30. The general requirements for both overall strength and distributed top surface load-carrying ability are thereby maintained.

Figure 3:
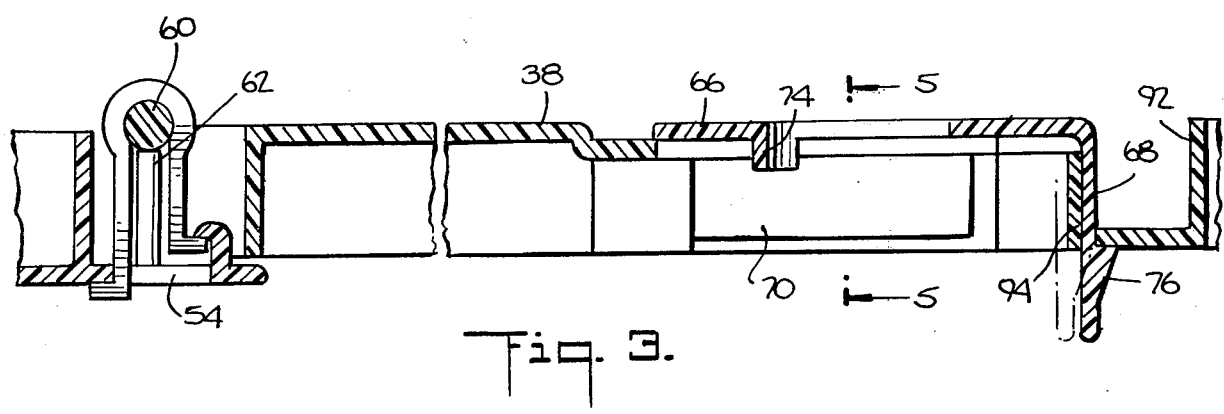
FIG. 3 is a cross section along the line 3—3 of FIG. 1 illustrating the latch and hinge arrangement.

A feature of the cage illustrated in the drawings is that all working parts of the cage are molded plastic construction. Another feature is that the cage comprises a minimum number of separate parts. For example, hinges 40 secure lid member 38 through slots 54 and 55 in flanges 46 and 47 respectively without the need for screws. This is accomplished by making each hinge 40 in the form of an inverted U-shaped portion 56 having outwardly-extending flanges 58 and 59. In the improved embodiment of the poultry cage of the present invention, two pairs of hinges 40 are used as opposed to the two single longer hinges of my previously described cage. This permits molding a bracing member 41 between the hinge pin 60 and the rest of the top at its center to provide increased structural strength for the 9 pin. Each hinge 40 slips over the hinge pin 60 integrally molded into lid member 38. The lid member 38 is then set in place so that hinge pins 60 lie on vertical spacer pins 62, integrally molded on flanges 46 and 47 at each end of slots 54 and 55. Flanges 58 and 59 are then compressed together and snapped through slots 54 and 55 to hold the lid member 38 firmly to flanges 46 and 47, as shown in FIG. 3.

The latch 42 of the present invention is illustrated in more detail on FIGS. 3–6. As illustrated, the latch of the present invention includes a sliding latch member 64 having a horizontal portion 66 with a depending vertical portion 68 at its front. Downwardly depending from the sides of the horizontal portion 66 are guide means 70. In the horizontal portion 66 is an opening 72 to provide a finger hold. It includes a rounded downwardly extending flange 74 to ease operation of the sliding latch. Located on the depending vertical portion 68 is a bevelled lip 76. Similar bevelled lips 78 are contained on the ends of the depending portions 70. A recess 80 in the end of the lid 38 is arranged to accept the sliding latch 64. Within the recess is a molded portions 82 having a central opening 84 and slots 86. The central opening 84 permits inserting a finger through both opening 72 and opening 84 to operate the latch. The downwardly extending portions 70 are flexible so that they can be pushed through the slots 86, allowing the bevelled lips 78 to snap into place beneath the edges 90 of the section of lid 38 forming the recess 80 as illustrated by FIG. 5. The slots 86 will, of course, be longer than the downwardly extending guide means 70 to permit the sliding latch to slide therein. Because the bevelled lips 78 snap into place, the latch is restrained from movement in any other direction. To bias the bevelled lip 76 into engagement with the transverse beam 92 at the edge of the opening 36 opposite the latch, spring means are provided for biasing the sliding latch 64 toward the transverse beam 92. In the illustrated embodiment these spring means comprise a bowed molded beam section 94 contained within the recess 80 in front of the section 82 containing the slots 86. By grasping the sliding latch 64 through the finger grip 74 it can be pulled backward against the bowed beam compressing it inwardly to release the bevelled lip 76 from the transverse beam 92. As with the hinges, the sliding latch 64 need simply be snapped into place. Thus, no additional mounting hardware is required.

Thus, an improved latch for a poultry cage or the like which is easy to construct and provides reliable operation has been shown. Although specific embodiments have been illustrated and described, it will be obvious to those skilled in the art that various modifications may be made without departing from the spirit of the invention which is intended to be limited solely by the appended claims.

What is claimed is:

1. In an animal transport cage having a rectangular frame structure supporting openwork sides, ends, bottom and top, with an enlarged opening in the top, said cage having a complementary lid hinged at one end to the opening in the top, an improved lid latch comprising:
   a. a sliding latch member having a horizontal portion and a vertical portion depending from the front thereof, with a beveled lip formed on said vertical depending portion to provide a catch and guide means on said horizontal portion;
   b. a transverse beam defining one side of the enlarged opening in the top of the cage at the edge of the opening opposite that which is hinged for engaging said catch; and
   c. means in said lid at the end opposite said hinged end for accepting and retaining said sliding latch and including:
      1. means cooperating with said guide means to permit motion of said sliding latch member in the plane of the lid perpendicular to the hinging axis and to restrain motion of said sliding latch member in all other directions; and
      2. a bowed beam member biasing said latch outward to cause said beveled lip to engage said transverse beam.

2. A cage according to claim 1 wherein said lid is molded plastic and said bowed beam member is integrally molded in said lid.

3. A cage according to claim 1 wherein said guide means comprise vertical dependent members extending downwardly from the sides of said horizontal member, and said means cooperating with said guide means comprise slots in said lid.

4. A cage according to claim 3 wherein said cage, lid, and sliding latch member are molded plastic and said members depending from the sides of said horizontal portions contain bevelled lips on their ends and further including a cutout in said lid internal said slots.

5. A cage according to claim 3 wherein said slots and beam are contained within a recess in said lid.

6. A cage according to claim 1 and further including an opening in said horizontal portion to provide a finger hold for sliding said latch member against the biasing force of said bowed beam member.

7. In an animal transport cage having a rectangular frame structure supporting openwork sides, ends, bottom and top, with an enlarged opening in the top, said cage having a complementary lid hinged at one end to the opening in the top, an improved lid latch comprising:
   a. a sliding latch member having a horizontal portion and a vertical portion depending from the front thereof, with a catch on said vertical depending portion and vertical depending members extending downwardly from the sides of said horizontal member containing beveled lips on their ends;
   b. means in the top of the cage at the edge of the opening opposite that which is hinged for engaging said catch means; and
   c. means in said lid at the end opposite said hinged end for accepting and retaining said sliding latch and including:
      1. a pair of parallel slots in said lid cooperating with said vertical depending members of said sliding latch member to permit motion of said sliding latch member in the plane of the lid perpendicular to the hinging axis and to restrain motion of said sliding latch member in all other directions;
      2. a cutout in said lid internal said slots;
      3. said cage, lid and sliding latch member being of molded plastic whereby, because of said cutout internal said slots, said beveled lips on the ends of said depending members on said sliding latch member can be inserted through said slots bending the sides thereof and thereafter be retained therein; and
      4. spring means biasing said latch to cause said catch means to engage said means in said top.

8. A cage according to claim 7 wherein said spring means comprises a bowed beam member biasing said sliding latch member outward into engagement with said means for engaging.

9. A cage according to claim 8 wherein said bowed beam member is molded into said lid.

10. a cage according to claim 9 wherein said slots and bowed beam are contained within a recess in said lid.

11. A cage according to claim 10 and further including an opening in said horizontal portion to provide a finger hold for sliding said latch member against the biasing force of said spring means.

* * * * *